July 31, 1951 N. H. SANGER 2,562,822
CHANCE CONTROLLED BALL GAME APPARATUS
Filed Jan. 27, 1949
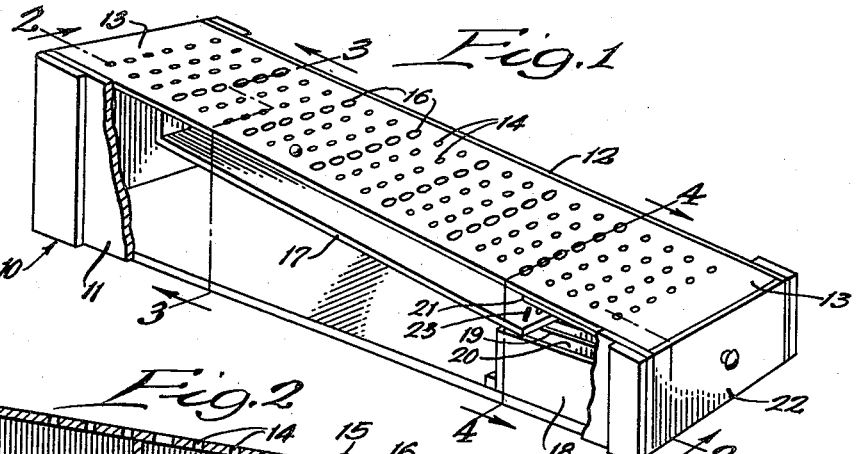
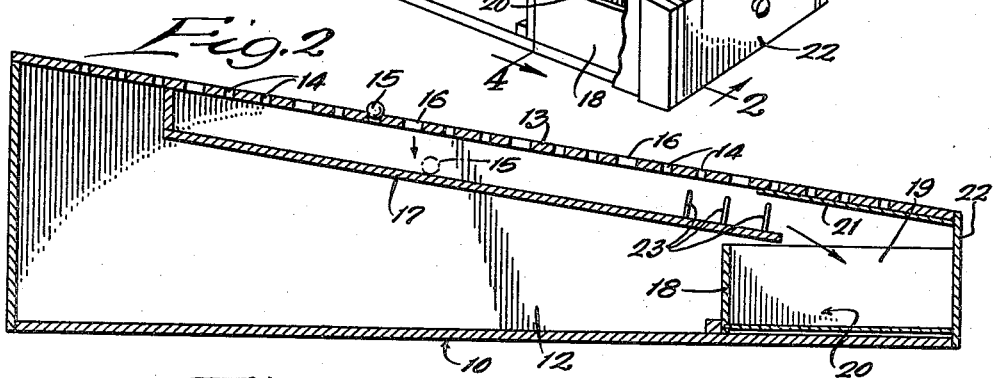
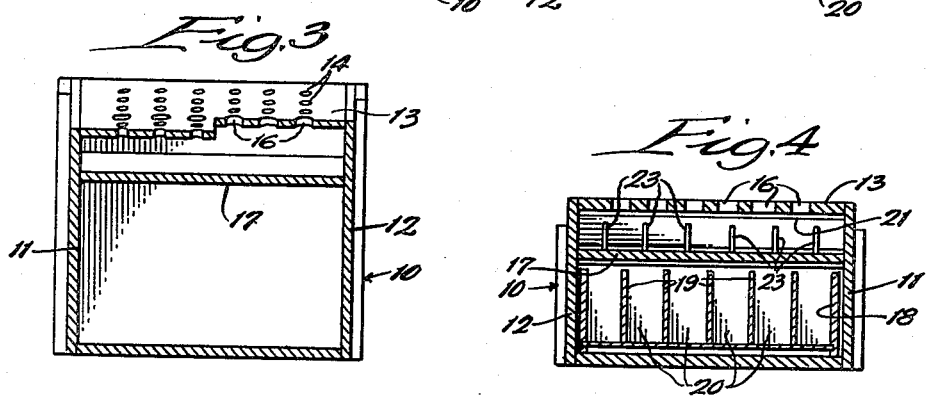
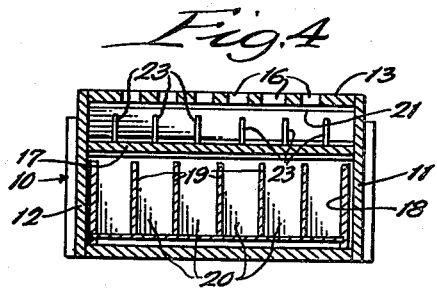
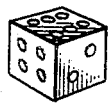
INVENTOR.
Norman H. Sanger,
By Dawson, Ormsby and Spangenberg,
Attorneys.

Patented July 31, 1951

2,562,822

UNITED STATES PATENT OFFICE 2,562,822

CHANCE CONTROLLED BALL GAME APPARATUS

Norman H. Sanger, Chicago, Ill.

Application January 27, 1949, Serial No. 73,177

4 Claims. (Cl. 273—134)

This invention relates to an amusement device, and it is an object of this invention to produce a device which may be used for the entertainment of old and young alike.

Another object is to produce a device in the form of an entertaining game to be played with "men," the movements of which are indicated by chance as well as by features embodied within the device itself.

These and other objects and advantages of this invention will hereinafter appear, and for purposes of illustration but not of limitation, an embodiment is shown in the accompanying drawing in which—

Figure 1 is a perspective view of an entertainment device embodying features of this invention with one wall broken away for purposes of disclosing the internal structure;

Figure 2 is a sectional view taken along the line 2—2 of Figure 1;

Figure 3 is a sectional elevational view taken along the line 3—3 of Figure 1;

Figure 4 is a sectional elevational view taken along the line 4—4 of Figure 1;

Figure 5 is a view of a marble which may comprise one of the movable "men"; and

Figure 6 suggests an indicator in the form of a die.

As shown in the drawing, the amusement device consists of a rectangular housing 10 defined by side walls 11 and 12 which are higher at one end than at the other to give a desired downward slope to a top wall 13.

The top wall 13 is provided with a plurality of openings aligned lengthwise and crosswise of the top wall to provide rows of openings in side by side relation. The openings in each row are arranged in corresponding predetermined pattern, some of the openings 14 being dimensioned to provide a rest for the movable "men" or marbles 15, as indicated in Fig. 2, while other openings 16 are dimensioned to permit passage of the marbles therethrough, as indicated by the hidden line in Fig. 2. In the specific illustration, there are six rows of aligned openings with twenty-three openings in each row, the greater portion of the openings being of the smaller dimension. However, the number of rows and the number of openings in each row may be varied at will without departing from the spirit of the invention.

Concealed within the housing is a ramp 17 supported to maintain a parallel relation with the top wall from which it is spaced. The lower end of the ramp 17 terminates before the lower end portion of the housing, and it is arranged to overlie a slidable drawer 18, the front of which constitutes an end wall 22 in the housing, which may be divided by partitions 19 into equal compartments 20 corresponding in number to the rows arranged in the top wall 13. If desired, the ramp 17 may be provided with pins, bells, or other obstructions to divert the path of travel of the marbles as they move downwardly along the ramp, or else to give certain sound effects as the marbles engage such obstructions.

As shown in Figure 5, the movable "men," representing the players, may constitute colored marbles. The chance movement of the "men" along the top wall may be indicated by throwing a die, such as shown in Figure 6, or by other suitable means, such as a spinning element, numbered cards, and the like.

In playing the game, each participant places a characteristically colored marble 15 in the first opening. The number of openings which each marble then is moved toward the lower end of the top wall is determined by the indicator as it is operated by the respective players. If by chance the marble stops upon an opening 16 of larger dimension through which it may pass, the marble falls through the opening and travels down the ramp, and if influenced by the obstructions, if any, falls into one or the other of the compartments 20.

From this point, there are many variations in which the game may be played. It may be that the person who has lost a marble is eliminated from the game, and the winner of the game is that person whose marble reaches the lower end of the top wall. It may be that the person who has lost a marble must open the drawer 18 and forfeit a penalty to the person in whose compartment the marble finally comes to rest. Further modification may be provided in that the penalized person must start anew from the top of the board.

To add greater tension to the game, a sight inhibitor 21, such as a board or opaque glass, or the like may be provided on the underside of the lower portion of the top wall 13 to conceal the drawer from the view of players through the openings 14 and 16 while the device is in the assembled relation.

It will be understood that numerous changes may be made in the details of construction, arrangement, and operation without departing from the spirit of the invention, especially as defined in the following claims.

I claim as my invention:

1. An amusement device to be used with movable playing pieces comprising a housing having an inclined top wall with a plurality of longitudinally aligned and spaced openings therethrough arranged in rows in side by side relation, some of the openings being dimensioned to support the playing pieces and others being dimensioned to permit passage of the playing pieces therethrough, a drawer slidable in the lower end of the housing, and a ramp in substantially parallel relation but spaced from the underside of the top wall with the lower end terminating over a section of the drawer when in the assembled relation.

2. An amusement device to be used with movable playing pieces comprising a housing having an inclined top wall with a plurality of longitudinally aligned and spaced openings therethrough arranged in rows in side by side relation, some of the openings being dimensioned to support the playing pieces and others being dimensioned to permit passage of the playing pieces therethrough, a drawer slidable in the lower end of the housing, a ramp in substantially parallel and spaced relation with the underside of the top wall, and obstructions distributed on the surface of the ramp to divert the playing pieces from their normal path of travel as they move down the ramp.

3. An amusement device, as claimed in claim 1, in which an obstruction is positioned at the underside of the top wall in the region of the lower end to conceal the drawer from vision through the openings when in the assembled relation.

4. An amusement device, as claimed in claim 1, in which the large and small dimensioned openings are similarly arranged in each longitudinally aligned row.

NORMAN H. SANGER.

REFERENCES CITED

The following references are of record in the file of this patent:

UNITED STATES PATENTS

| Number | Name | Date |
|---|---|---|
| 547,771 | Cross | Oct. 15, 1895 |
| 607,020 | Dodge | July 12, 1898 |
| 711,383 | Caille | Oct. 14, 1902 |
| 1,218,374 | Coates | Mar. 6, 1917 |
| 1,282,418 | Haskell | Oct. 22, 1918 |
| 2,463,425 | Rendel | Mar. 1, 1949 |

FOREIGN PATENTS

| Number | Country | Date |
|---|---|---|
| 19,831 | Great Britain | 1911 |